(12) United States Patent
Ogasa

(10) Patent No.: US 9,159,989 B2
(45) Date of Patent: Oct. 13, 2015

(54) ALL-SOLID BATTERY AND METHOD OF MANUFACTURING THE SAME

(75) Inventor: Kazuhito Ogasa, Kanagawa (JP)

(73) Assignee: OHARA INC. (JP)

( * ) Notice: Subject to any disclaimer, the term of this patent is extended or adjusted under 35 U.S.C. 154(b) by 445 days.

(21) Appl. No.: 12/883,603

(22) Filed: Sep. 16, 2010

(65) Prior Publication Data

US 2011/0065006 A1    Mar. 17, 2011

(30) Foreign Application Priority Data

Sep. 17, 2009 (JP) ................................. 2009-215315
Aug. 6, 2010 (JP) ................................. 2010-177609

(51) Int. Cl.
| | |
|---|---|
| *H01M 6/18* | (2006.01) |
| *H01M 4/58* | (2010.01) |
| *B32B 37/14* | (2006.01) |
| *H01M 4/04* | (2006.01) |
| *H01M 4/13* | (2010.01) |
| *H01M 4/139* | (2010.01) |
| *H01M 4/36* | (2006.01) |
| *H01M 10/0525* | (2010.01) |

(52) U.S. Cl.
CPC ............. *H01M 4/0471* (2013.01); *H01M 4/13* (2013.01); *H01M 4/139* (2013.01); *H01M 4/366* (2013.01); *H01M 4/5825* (2013.01); *H01M 10/0525* (2013.01); *H01M 2300/0068* (2013.01); *H01M 2300/0071* (2013.01); *Y02E 60/122* (2013.01); *Y10T 156/10* (2015.01)

(58) Field of Classification Search
CPC .......... H01M 6/18; H01M 4/58; B32B 37/14
USPC .......... 429/319, 231.8, 219–224, 231.5, 322; 156/60
See application file for complete search history.

(56) References Cited

U.S. PATENT DOCUMENTS

| | | | |
|---|---|---|---|
| 2007/0259271 A1* | 11/2007 | Nanno et al. ................. | 429/318 |
| 2008/0020283 A1* | 1/2008 | Miyashiro et al. ............ | 429/322 |
| 2008/0124623 A1* | 5/2008 | Hisamitsu et al. ............ | 429/156 |
| 2009/0081554 A1* | 3/2009 | Takada et al. ................. | 429/322 |
| 2009/0123847 A1* | 5/2009 | Okada et al. .................. | 429/319 |
| 2011/0039162 A1* | 2/2011 | Maeda .......................... | 429/320 |

FOREIGN PATENT DOCUMENTS

JP    2007-227362    9/2007

* cited by examiner

*Primary Examiner* — Karie O'Neill Apicella
(74) *Attorney, Agent, or Firm* — Cantor Colburn LLP

(57) ABSTRACT

The all-solid battery has two electrode layers of a positive electrode and a negative electrode interposing a solid electrolyte layer therebetween, in which at least one of the electrode layers is composed of a sintered body of a mixed material including at least one or more types of electrode active material particles comprising electrode active material and solid electrolyte particles comprising solid electrolyte, and a portion of at least 30% by area of a grain boundary surrounding the electrode active material particles has a coating layer with a thickness of 1 to 200 nm.

9 Claims, 2 Drawing Sheets

ALL-SOLID BATTERY AND METHOD OF MANUFACTURING THE SAME

This application is based on and claims the benefit of priority from Japanese Patent Application Nos. 2009-215315 and 2010-177609, respectively filed on 17 Sep. 2009 and 6 Aug. 2010, the contents of which are incorporated herein by reference.

BACKGROUND OF THE INVENTION

1. Field of the Invention

The present invention relates to an all-solid battery and a method of manufacturing the all-solid battery, and particularly relates to an all-solid lithium ion battery and a method of manufacturing the all-solid lithium ion battery.

2. Related Art

In an all-solid battery, in which an inorganic solid electrolyte is used, and an organic compound is not even used in an electrode, there is no risk of liquid leakage and gas generation; therefore, the all-solid battery is expected to be a safe battery. Moreover, as compared to a liquid-based battery, the all-solid battery is rare for a reaction other than a cell reaction to occur, and thus it is expected that the life of the battery can be extended.

Furthermore, in a case in which a sintered body is used as an inorganic solid electrolyte, a method is used, in which an inorganic solid electrolyte precursor and an electrode precursor are laminated, and these are calcined at the same time, a result of which a sintered body of an electrode and a solid electrolyte can be prepared, and the interface can be preferably joined. In this method, while manufacturing cost is reduced by reducing manufacturing processes, reduction of ionic migration resistance can be expected in the interface where the electrode layer and the solid electrolyte layer have been joined.

However, in a lithium ion battery having a particularly high electromotive force, a positive electrode is composed of materials with a high oxidizing power, and a negative electrode is composed of materials with a high reducing power.

Therefore, in a case in which these materials and a solid electrolyte are calcined at the same time, a problem is likely to occur in which, in the interface between a solid electrolyte layer and an electrode layer, a reaction between the two layers would generate chemical compounds that inhibit ionic conduction. In addition, in order to impart ionic conductivity in an electrode, an electrode precursor preferably contains an electrode active material powder and a solid electrolyte powder. However, even in a grain boundary between these powders, chemical compounds that do not contribute to a cell reaction, and chemical compounds that inhibit ionic conduction may be generated due to a reaction during calcination. Therefore, even if an interface between the electrode layer and the solid electrolyte layer is joined well by calcination, lithium ionic migration resistance is increased due to chemical compounds generated in the interface between the electrode layer and the solid electrolyte layer and in a grain boundary between the electrode active material and the solid electrolyte in the electrode layer; therefore, charge and discharge at a high current will not be realized after all.

Furthermore, even in a case in which chemical compounds that inhibit ionic conduction are not generated, if electrical conductivity of an electrode active material itself is low, supply and emission of electrons are not performed well in the electrode active material; therefore, charge and discharge at a high current would not be realized, either.

In order to solve such problems, a method has been proposed in which a low temperature is employed as a calcination temperature; however, since sintering of an electrode and a solid electrolyte is insufficient in such a method, charge and discharge at a high current have not been realized.

Patent Document 1 proposes a method, in which a low-oxygen atmosphere is used as an atmosphere for calcining a laminate composed of an electrode precursor, a solid electrolyte precursor, etc. However, a battery manufactured by this method merely performs charge and discharge at an extremely small current of 0.88 $\mu A/cm^2$; therefore, charge and discharge at a high current have not been realized.

Patent Document 1: Japanese Unexamined Patent Application Publication No. 2007-227362

SUMMARY OF THE INVENTION

A problem of the present invention is to provide an all-solid battery, preferably an all-solid lithium ion battery, and a method of manufacturing them, in which there are extremely few materials that inhibit ionic conduction in an interface between an electrode layer and a solid electrolyte layer, or in a grain boundary between an electrode active material and an electrolyte; charge and discharge at a high current is possible; high charge and discharge efficiency can be obtained even at a large operation current; and manufacturing cost is reduced.

Another problem of the present invention is to provide an all-solid battery, preferably an all-solid lithium ion battery, and a method of manufacturing them, and even in a case in which electrical conductivity of an electrode active material itself is low, supply and emission of electrons are performed well in the electrode active material, and thus charge and discharge at a high current is possible.

As a result of having conducted extensive research in view of the aforementioned problems, the inventor has found that the aforementioned problems are solved if a portion of at least 30% by area of a grain boundary surrounding the electrode active material particles in an electrode layer has a coating layer with a thickness of 1 to 200 nm, and the inventor has completed the present invention. Specific aspects of the present invention are as follows.

According to a first aspect of the present invention, there is provided an all-solid battery including two electrode layers composed of a positive electrode layer and a negative electrode layer interposing a solid electrolyte layer therebetween, in which at least one of the two electrode layers is composed of a sintered body of a mixed material including at least one or more types of electrode active material particles comprising electrode active material and solid electrolyte particles comprising solid electrolyte, and a portion of at least 30% by area of a grain boundary surrounding the electrode active material particles has a coating layer with a thickness of 1 to 200 nm.

According to a second aspect of the present invention as recited in the first aspect, there is provided an all-solid battery, in which content of the coating layer is 0.1% by mass or more in relation to an electrode active material, in at least one of the electrode layers.

According to a third aspect of the present invention as recited in the first or second aspect, there is provided an all-solid battery, in which the coating layer is a material including at least one chemical element selected from the group consisting of C, Au, Ag, Cu, Pd, Ru, Ni, Fe, Co, Mn, Ti, Sn, Al, and Si.

According to a fourth aspect of the present invention as recited in any one of the first to third aspects, there is provided an all-solid battery, in which content of a solid electrolyte is 10 to 70% by mass in relation to an electrode active material, in at least one of the electrode layers. According to a fifth aspect of the present invention as recited in any one of the first to fourth aspects, there is provided an all-solid battery, in which the solid electrolyte is a chemical compound including a form of crystal having lithium ion conductivity.

According to a sixth aspect of the present invention as recited in any one of the first to fifth aspects, there is provided an all-solid battery, in which the crystals having lithium ion conductivity have molecular formula $Li_{1+x+z}M_x(Ge_{1-y}Ti_y)_{2-x}Si_zP_{3-z}O_{12}$, where $0 \leq x \leq 0.8$, $0 \leq y \leq 1.0$, $0 \leq z \leq 0.6$, and M is at least one selected from Al or Ga).

According to a seventh aspect of the present invention as recited in any one of the first to sixth aspects, there is provided an all-solid battery, in which the electrode active material is a material including at least one chemical element selected from the group consisting of C, Li, Mg, Mn, Fe, Co, Ni, B, Al, Ti, Si, Ge, Sn, Bi, W and O.

According to an eighth aspect of the present invention as recited in any one of the first to seventh aspects, there is provided an all-solid battery, in which the solid electrolyte layer and the electrode layer composed of the sintered body are joined by calcining.

According to a ninth aspect of the present invention, there is provided a method of manufacturing an all-solid battery, the method includes: an electrode layer calcination step of calcining at least one of electrode layer precursors composed of a positive electrode precursor and a negative electrode precursor; and a solid electrolyte layer calcination step of calcining a solid electrolyte layer precursor, in which at least one of the two electrode layer precursors is a compact having at least: an electrode material powder on which a coating layer with a thickness of 1 to 200 nm has been coated in coverage of 30% by area or more on a particle surface of an electrode active material; and a solid electrolyte powder.

According to a tenth aspect of the present invention as recited in the ninth aspect, there is provided a method of manufacturing an all-solid battery, in which a mass ratio of the coating layer of the electrode material powder is 0.1% by mass or more in relation to the electrode active material.

According to an eleventh aspect of the present invention as recited in the ninth or tenth aspect, there is provided a method of manufacturing an all-solid battery, further comprises laminating the solid electrolyte layer precursor on at least one of the electrode layer precursor, in which the electrode layer calcination step of calcining at least one of the electrode layer precursors is performed together with the solid electrolyte layer calcination step of calcining the solid electrolyte layer precursor.

According to a twelfth aspect of the present invention as recited in the ninth or tenth aspect, there is provided a method of manufacturing an all-solid battery, in which the solid electrolyte layer calcination step of calcining the solid electrolyte layer precursor is performed by laminating and calcining a solid electrolyte layer precursor on an electrode layer that has been calcined by the electrode layer calcination step, after the electrode layer calcination step of calcining at least one of the electrode layer precursors.

According to a thirteenth aspect of the present invention as recited in any one of the ninth to twelfth aspects, there is provided a method of manufacturing an all-solid battery, in which the electrode layer calcination step of calcining at least one of the electrode layer precursors is performed by laminating and calcining at least one of the electrode layer precursors that have been calcined by the solid electrolyte layer calcination step, after the solid electrolyte layer calcination step of calcining the solid electrolyte layer precursor.

According to a fourteenth aspect of the present invention as recited in any one of the ninth to thirteenth aspects, there is provided a method of manufacturing an all-solid battery, in which the electrode layer calcination step of calcining at least one of the electrode layer precursors is a step of performing calcination in an atmosphere including at least one gas selected from the group consisting of $N_2$, $H_2$, He, Ar, $CO_2$, CO and $CH_4$.

According to a fifteenth aspect of the present invention as recited in any one of the ninth to fourteenth aspects, there is provided a method of manufacturing an all-solid battery, in which the electrode layer calcination step of calcining at least one of the electrode layer precursors is a step of calcining a material being capable of reducing oxygen partial pressure in a calcining atmosphere while the material is in contact with the electrode layer precursor.

According to a sixteenth aspect of the present invention as recited in any one of the ninth to fifteenth aspects, there is provided a method of manufacturing an all-solid battery, in which the electrode layer calcination step of calcining at least one of the electrode layer precursors is performed in a temperature range with a maximum temperature from 600 to 1,200 degrees Celsius inclusive.

A "sintered body" described in the present specification refers to a dense aggregate of particles that is obtained, through calcination of a cluster of particles, by way of chemical bonding of atoms on a particle surface with atoms on another particle surface, or chemical bonding of atoms on a particle surface on a coating layer with adjacent atoms on the coating layer. A "grain boundary" herein refers to a boundary of particles adjacent to each other. Here, in a case in which a coating layer is present between particles adjacent to each other, a region in which the coating layer is present is referred to as a boundary.

According to the present invention, when sintering a laminate composed of an electrode precursor, an electrolyte precursor, etc., decomposition of a solid electrolyte and an electrode active material is suppressed in an interface between a solid electrolyte layer and an electrode layer, and/or in a grain boundary between the electrode active material and the solid electrolyte in an electrode; and as a result, chemical compounds that significantly inhibit ionic conduction are not readily generated. Therefore, it is possible to obtain an all-solid battery, preferably an all-solid lithium ion battery, in which charge and discharge at a high current is possible, and high charge and discharge efficiency can be obtained even at a large operation current.

Moreover, even in a case in which electrical conductivity of an electrode active material itself is low, supply and emission of electrons are performed well in the electrode active material; therefore, it is possible to obtain an all-solid battery, preferably an all-solid lithium ion battery, in which charge and discharge at a high current is possible.

DETAILED DESCRIPTION OF THE INVENTION

Figure 1:
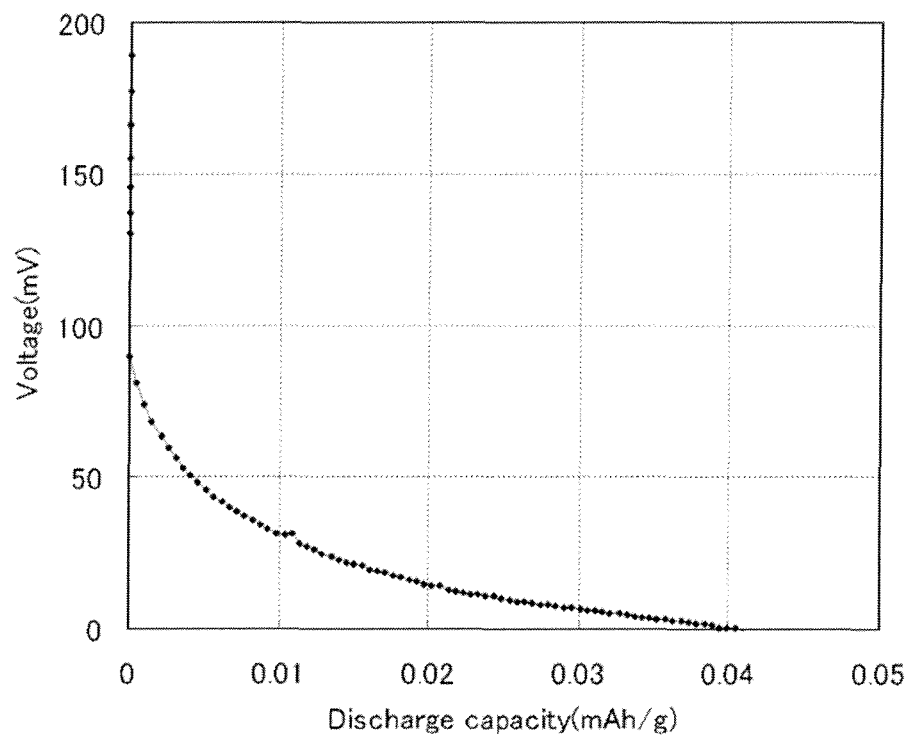
FIG. 1 is a graph showing discharge characteristics of Sample 3, in which the vertical axis represents electric voltage and the horizontal axis represents discharge capacity.
Figure 2:
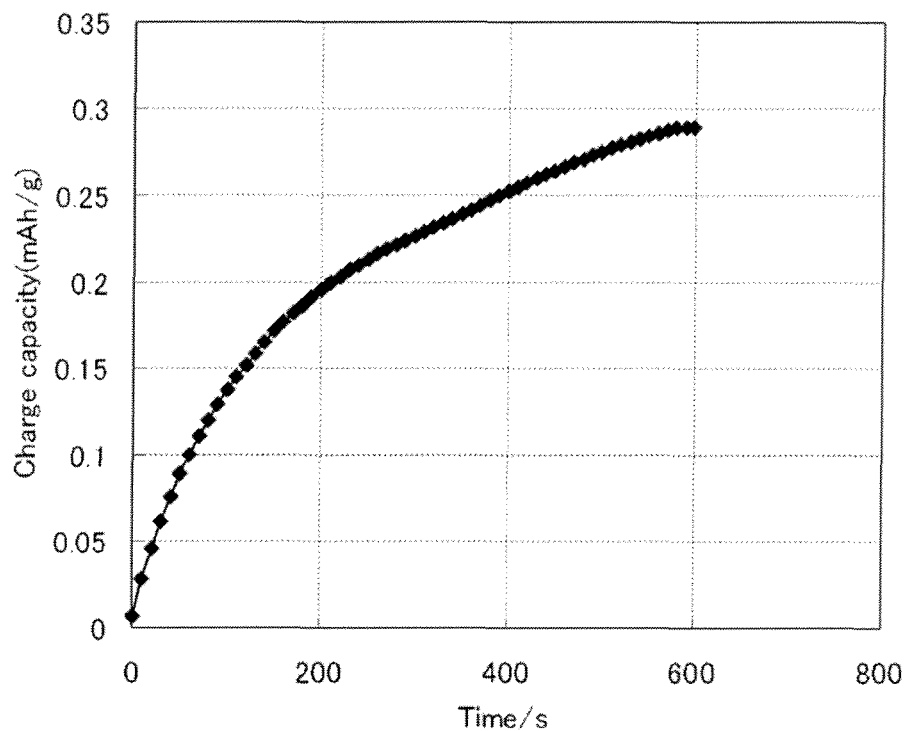
FIG. 2 is a graph showing charging characteristics of Sample 3, in which the vertical axis represents charge capacity, and the horizontal axis represents time.
Figure 3:
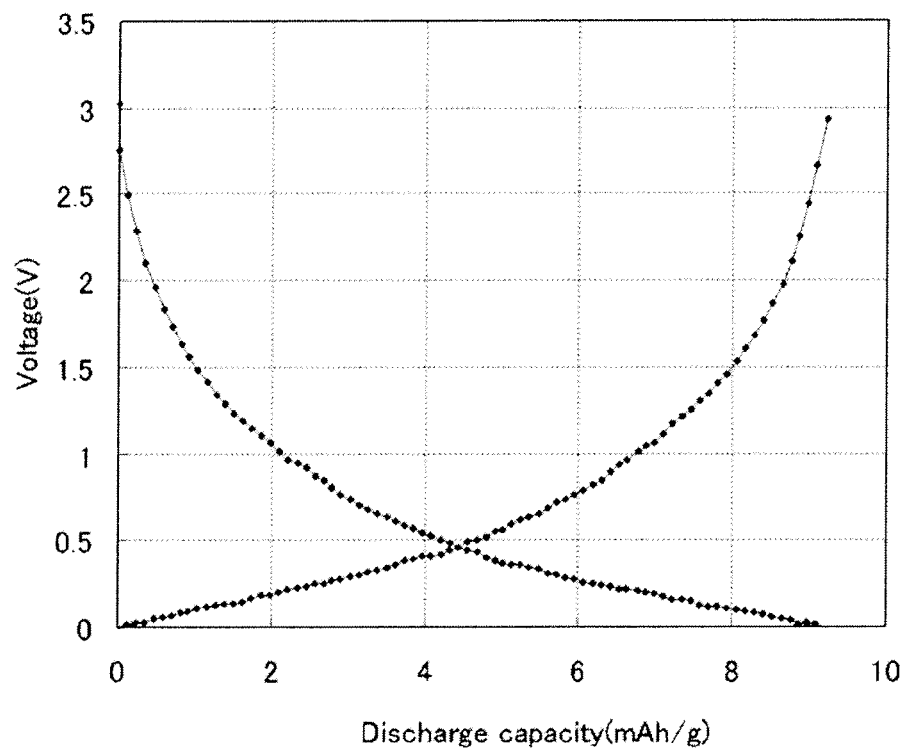
FIG. 3 is a graph showing charge and discharge characteristics of Sample 4, in which the vertical axis represents electric voltage, and the horizontal axis represents charge and discharge capacity.
Figure 4:
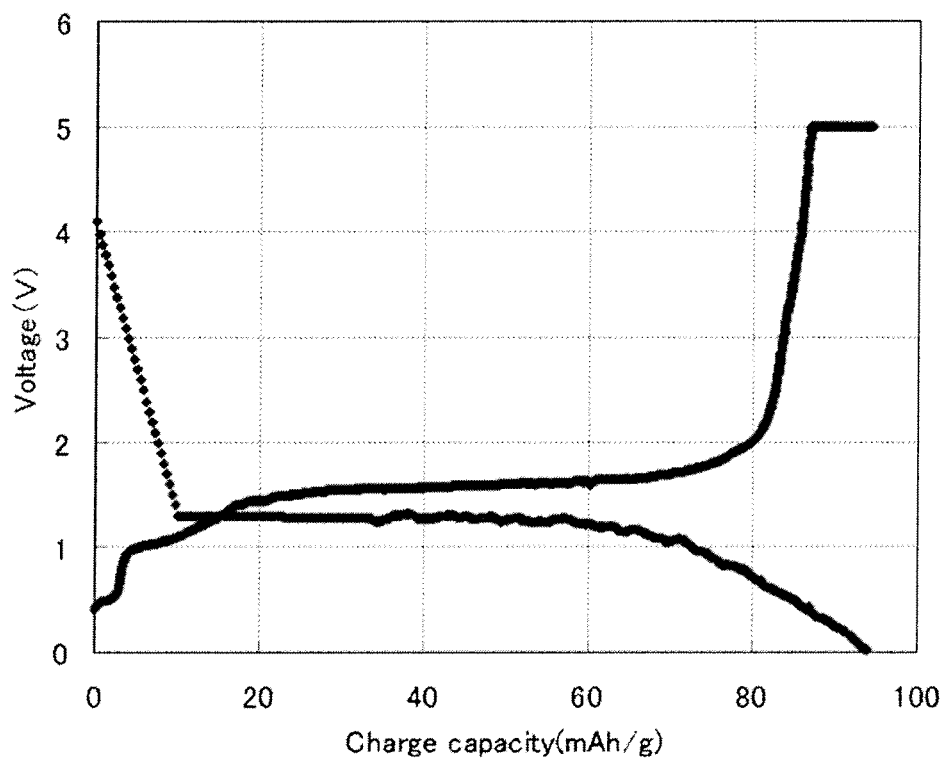
FIG. 4 is a graph showing charge and discharge characteristics of Sample 5, in which the vertical axis represents electric voltage, and the horizontal axis represents charge and discharge capacity.

An all-solid battery of the present invention has two electrode layers of a positive electrode and a negative electrode, interposing a solid electrolyte layer therebetween, in which at least one electrode layer is sintered by way of calcination, and this electrode layer is preferably joined to the solid electrolyte layer by way of calcination. Each of the two electrode layers has a current collector layer on an opposite surface of the solid electrolyte layer. At least one sintered electrode layer is a sintered body that is a mixed material including at least one or more types of electrode active material particles and solid electrolyte particles, and a portion of at least 30% by area of a grain boundary of these particles has a coating layer with a thickness of 1 to 200 nm.

In this way, a material that is resistant to reacting with the electrode active material or the solid electrolyte during calcination, or a material that is superior in electrical conductivity is provided as a coating layer on a portion of at least 30% by area of the grain boundary surrounding the sintered electrode active material particles, and a thickness of the coating layer is set in a range of 1 to 200 nm, thereby solving the problems of the present invention.

The material that is resistant to reacting with the electrode active material or the solid electrolyte during calcination, or the material that is superior in electrical conductivity, which is provided as the coating layer, is often a material of which ionic conductivity is lower than that of the solid electrolyte. Therefore, a thickness of the coating layer needs to be 200 nm or less, more preferably 100 nm or less, and most preferably 50 nm or less. In a case in which the thickness of the coating layer exceeds 200 nm, the ionic conduction resistance is increased, and thus charge and discharge at a high current becomes difficult. On the other hand, in a case in which the thickness of the coating layer is less than 1 nm, an effect of suppressing a reaction with the electrode active material or the solid electrolyte during calcination cannot be expected. Therefore, the thickness of the coating layer is preferably 1 nm or more, more preferably 3 nm or more, and most preferably 5 nm or more.

Moreover, the coating layer needs to be present on a portion of 30% by area or more, more preferably present on a portion of 70% by area or more, and most preferably present on a portion of 90% by area or more of the entire area of the grain boundary surrounding the electrode active material particles. In a case in which an area on which the coating layer is present is less than 30% by area of the entire area of the grain boundary, a chemical compound that significantly inhibits ionic conduction is generated on the grain boundary, and thus charge and discharge at a sufficiently large electric current becomes difficult.

In this way, in the present invention, the thickness of the coating layer and the area on which the coating layer is present are set within a predetermined range, thereby enabling charge and discharge at a sufficiently high current.

The thickness of the coating layer in the electrode layer can be confirmed by shaving an impalpable powder off the electrode layer to prepare a sample, and observing the sample with a TEM (transmission electron microscope). In addition, since it is difficult to three-dimensionally measure a ratio of an area on which the coating layer is present, a ratio of lengths, for which the coating layer is formed, in relation to a total of lengths of grain boundary lines that appear on a TEM image, is assumed as a ratio of the area on which the coating layer is present. In a case in which observation with a TEM is not possible, a sample is observed by way of mapping analysis with an EPMA (electron probe microanalyzer), and a ratio of the area on which the coating layer is present is similarly obtained. A ratio of the area on which the coating layer is present may not be measured for all locations of the battery, and a value of measuring an arbitrarily selected location by using a TEM image can be used. Furthermore, even if a ratio of the area on which the coating layer is present is different in only some particularly extremely limited locations (for example, 3% or less of the volume of the electrode layer) from a ratio in other locations, as long as the other locations satisfy the condition of the ratio of the area on which the coating layer is present as defined in the present invention, the battery can achieve the effects of the present invention.

In the electrode layer including the coating layer, the content of the coating layer in relation to the mass of the electrode active material of the electrode layer is preferably 0.1% by mass or more, more preferably 3% by mass or more, and most preferably 7% by mass or more. The content of the coating layer is preferably 0.1% by mass or more, and in a case in which the content is less than 0.1% by mass, it becomes difficult to sufficiently obtain the reaction suppressing effect during calcination.

On the other hand, the upper limit of the content of the coating layer in relation to the mass of the electrode active material of the electrode layer is preferably 20% by mass, more preferably 15% by mass or less, and most preferably 12% by mass or less. In a case of exceeding 12% by mass, the ionic conduction resistance is increased.

The content of the coating layer in the electrode layer is measured by way of a TG-DTA (simultaneous thermogravimetric/differential thermal analysis) or an EDX (energy dispersion X-rays spectroscopy) observation with an SEM (scanning electron microscope).

Here, the material composing the coating layer is a material including at least one chemical element selected from the group consisting of C, Au, Ag, Cu, Pd, Ru, Ni, Fe, Co, Mn, Ti, Sn, Al and Si. More preferable examples of the material composing the coating layer include: a simple substance of C, Au, Ag, Cu, Pd, Ru, Ni, Fe, Co, Mn, Ti, Sn, Al or Si; an alloy including at least one chemical element selected from the group consisting of Au, Ag, Cu, Pd, Ru, Ni, Fe, Co, Mn, Ti, Sn and Al; an oxide including at least one chemical element selected from the group consisting of Cu, Pd, Ru, Ni, Fe, Co, Mn, Ti, Sn, Al and Si; a phosphate including at least one chemical element selected from the group consisting of Cu, Pd, Ru, Ni, Fe, Co, Mn, Ti, Sn, Al and Si; a nitride including at least one chemical element of Sn and Si; or a carbide of Si. Among them, a simple substance of C such as activated carbon, graphite and acetylene black is preferable in terms of its high effect of suppressing a reaction with a lithium ion conductive solid electrolyte including crystals of $Li_{1+x+z}M_x(Ge_{1-y}Ti_y)_{2-x}Si_zP_{3-z}O_{12}$ (where $0 \leq x \leq 0.8$, $0 \leq y \leq 1.0$, $0 \leq z \leq 0.6$, M=at least one is selected from Al and Ga) or an electrode active material such as $LiNiPO_4$, $LiCoO_2$ and $LiMn_2O_4$.

On the other hand, from a viewpoint that the electrical conductivity of the electrode active material interface is improved, and the charge and discharge reaction area in the electrode active material interface is increased, the coating layer is preferably a metal composed of any of Ni, Co, Fe, Mn, Cr, Mg and Cu, or an alloy composed of at least two chemical elements thereof, and most preferably an alloy of Ni and Mg. In this case, the coating layer may include a very small amount of unintended impurity or a very small amount of a component diffused from the electrode active material or the solid electrolyte.

In a case in which the content of the solid electrolyte in the electrode layer is excessively high, the active material in the electrode relatively decreases; therefore, the battery capacity is likely to decrease. Moreover, in a case in which the content of the solid electrolyte in the electrode layer is low, the ionic conduction resistance in the electrode layer increases. Therefore, in order to obtain a battery with high capacity and high current, the ratio of the solid electrolyte in relation to the mass of the electrode active material is preferably 10 to 70% by mass, more preferably 20 to 50% by mass, and most preferably 25 to 40% by mass.

This ratio can be obtained from peak intensity of a material included in the electrode layer, the peak intensity obtained by way of powder X-ray diffraction measurement.

Here, a chemical compound including crystals having lithium ion conductivity can be used as a solid electrolyte. For example, LiN, LISICONs, $La_{0.55}Li_{0.35}TiO_3$ having a perovskite structure, or a material having a NASICON-type structure (for example, $Li_{1+x}Al_x(Ti, Ge)_{2-x}(PO_4)_3$, $LiTi_2P_3O_{12}$, $Li_{1.5}Al_{0.5}Ge_{1.5}(PO_4)_3$, etc.) can be used.

Among them, in particular, a material including crystals of $Li_{1+x+y}(Al, Ga)_x(Ti, Ge)_{2-x}Si_yP_{3-y}O_{12}$ (where $0 \leq x \leq 1$ and $0 \leq y \leq 1$) has high lithium ion conductivity, and is chemically stable, thereby providing an advantage of being easy to handle. In addition, the crystals can be deposited as crystals in glass ceramics by heat-treating of glass having a specific composition. The particles of the glass ceramics having the crystals are preferable in terms of having almost no voids or grain boundaries that disturb ionic conduction in the particles. It should be noted that, in the above formula, the notations of "(Al, Ga)" and "(Ti, Ge)" mean "Al and/or Ga" and "Ti and/or Ge", respectively.

Here, the glass ceramics refers to a material obtained by heat-treating of amorphous glass to deposit a crystalline phase in a glass phase, and a material composed of a amorphous solid and crystals. Furthermore, the glass ceramics includes a material in which the entire glass phase has been phase-transitioned into the crystalline phase, i.e. a material of which crystal quantity (crystallinity) is 100% by mass. The glass ceramics has almost no voids among the particles of deposited crystals or in the deposited crystals, and thus are advantageous in terms of ionic conduction.

When manufacturing a solid electrolyte layer or when manufacturing an electrode layer, a powder of the glass ceramics or a powder of raw glass of the glass ceramics can be used in order to contain the solid electrolyte in the electrode layer. In a case of using a raw glass powder, the raw glass powder becomes glass ceramics by depositing crystals in the glass powder in a calcination process of the solid electrolyte layer and the electrode layer.

The glass ceramics, in which crystals of $Li_{1+x+y}(Al, Ga)_x(Ti, Ge)_{2-x}Si_yP_{3-y}O_{12}$ (where $0 \leq x \leq 1$ and $0 \leq y \leq 1$) have been deposited as a crystal phase, can be obtained as follows. Glass, in which content of each component is represented in mol % as:

$Li_2O$: 10 to 25%;
$Al_2O_3+Ga_2O_3$: 0.5 to 15%;
$TiO_2+GeO_2$: 25 to 50%;
$SiO_2$: 0 to 15%; and
$P_2O_5$: 26 to 40% is melted and quenched to obtain raw glass, and subsequently, the obtained raw glass is heat-treated to deposit crystals.

The electrode active material for the electrode layer that can be used in the all-solid battery of the present invention is a material including at least one chemical element selected from the group consisting of C, Li, Mg, Mn, Fe, Co, Ni, B, Al, Ti, Si, Ge, Sn, Bi, W and O. More preferable examples as a material composing the electrode active material include: a simple substance of C, Li, Ti, Si or Sn; an oxide including at least one chemical element selected from the group consisting of Li, Mg, Mn, Fe, Co, Ni, B, Al, Ti, Si, Ge, Sn, Bi and W; a phosphate including at least one chemical element selected from the group consisting of Li, Mg, Mn, Fe, Co, Ni, B, Al, Ti, Si, Ge, Sn, Bi and W; a borate including at least one chemical element selected from the group consisting of Li, Mg, Mn, Fe, Co, Ni, Al, Ti, Si, Ge, Sn, Bi and W; a silicate including at least one chemical element selected from the group consisting of Li, Mg, Mn, Fe, Co, Ni, B, Al, Ti, Ge, Sn, Bi and W; or a nitride including at least any one chemical element of Si and Sn.

Although a voltage of the battery is determined by a standard electrode potential of a material(s) selected from them, some combination of materials can be an electrode active material for both positive electrode and negative electrode. In terms of heat stability, $LiNiPO_4$, $LiFePO_4$ and $LiMn_2O_4$ are preferable as an electrode active material for positive electrode; and graphite, activated carbon and $Li_4Ti_5O_{12}$ are preferable as an electrode active material for negative electrode.

The laminate of the electrode layer and the solid electrolyte layer in the all-solid battery of the present invention can be manufactured by performing: an electrode layer calcination step of calcining an electrode layer precursor; and a solid electrolyte layer calcination step of calcining a solid electrolyte layer precursor. Various aspects can be used as a method of calcination.

In other words, there are aspects such as: a method in which the electrode layer precursor and the solid electrolyte layer precursor are each calcined and then laminated, and subsequently calcined again to join each layer and form a sintered body; a method in which any one layer of the electrode layer precursor and the solid electrolyte layer precursor is calcined to form a sintered body, and then a precursor is laminated on the sintered body, thereby calcining (sintering) and joining the sintered body and the precursor at the same time; and a method in which two or more precursors are laminated, and then calcined at the same time, thereby joining interlayers while forming a sintered body.

More specifically, there are six aspects as follows.

(1) A method in which two electrode layer precursors and a solid electrolyte layer precursor are laminated, and then calcined (sintered) at the same time.

(2) A method in which one electrode layer precursor and a solid electrolyte layer precursor are laminated and calcined (sintered), and the electrode layer precursor is laminated on the calcined (sintered) solid electrolyte layer and calcined (sintered) again.

(3) A method in which a solid electrolyte layer precursor is laminated on one calcined (sintered) electrode layer and calcined (sintered), and an electrode layer precursor is laminated on a calcined (sintered) solid electrolyte layer and calcined (sintered) again.

(4) A method in which an electrode layer precursor is laminated on one calcined (sintered) solid electrolyte layer, and another electrode layer precursor is laminated on the solid electrolyte layer and calcined (sintered) again.

(5) A method in which two electrode layer precursors are laminated on one calcined (sintered) solid electrolyte layer and calcined (sintered).

(6) A method in which two calcined (sintered) electrode layers are laminated by interposing a solid electrolyte layer precursor therebetween and calcined (sintered).

Furthermore, although a current collector is laminated on the electrode layer, this formation may be performed by calcining (sintering) the precursor. It should be noted that the current collector is not necessary if the electrical conductivity of the electrode layer itself is high.

The solid electrolyte layer precursor may be formed by using a powder of the solid electrolyte as a solid electrolyte powder. In order to densify the solid electrolyte layer and increase the ionic conductivity, the average particle diameter of the solid electrolyte powder is preferably 0.1 to 3 µm, more preferably 0.1 to 1 µm, and most preferably 0.1 to 0.6 µm.

As an electrode material powder, the electrode layer precursor may be formed by using an electrode active material powder, a solid electrolyte powder as necessary, and an electron conduction ancillary material powder. Carbon, a metal such as titanium, nickel, chromium, iron, stainless steel and aluminum, and a precious metal such as platinum, gold and rhodium can be included as an electron conduction ancillary material. In order to increase an area in which an electrode reaction occurs, the average particle diameter of the electrode active material powder is preferably 0.1 to 10 µm, more preferably 0.1 to 3 µm, and most preferably 0.1 to 1 µm. In order to increase an area in which the reaction occurs, the average particle diameter of the solid electrolyte powder included in the electrode layer precursor is preferably 0.1 to 10 µm, more preferably 0.1 to 1 µm, and most preferably 0.1 to 0.6 µm. In order to increase the conductivity, the average particle diameter of the electron conduction ancillary material powder is preferably 10 nm to 3 µm, more preferably 10 nm to 1 µm, and most preferably 10 nm to 50 nm.

It should be noted that the average particle diameter is a value of D50 (accumulated 50% diameter) when measured by way of a laser diffraction method, and more specifically, a value measured by way of a particle size analyzer (Micro Track MT 3300 EX II, manufactured by Nikkiso Co., Ltd.) or a submicron particle analyzer (N5, manufactured by Beckman Coulter, Inc.) can be used. It should be noted that the average particle diameter is a value expressed on a volume basis.

In order to form a coating layer on a grain boundary of particles of the electrode active material and the solid electrolyte that have been sintered, it is preferable to form an electrode material powder by coating a surface of a raw material powder of the electrode layer precursor with a material serving as a coating layer. The material serving as a coating layer may be coated on a surface of the solid electrolyte powder and/or a surface of the electrode active material powder. Among them, coating on the surface of the electrode active material powder is most preferable in terms of being easy to effectively form a coating layer on the grain boundary surrounding the electrode active material particles during sinter.

For example, in a case of coating the surface of the electrode active material particles, water may be vaporized while mixing the electrode active material and a sucrose solution, and the mixture may be heat-treated in a graphite crucible in an inert atmosphere.

When coating the surface of the electrode active material particles, by making the thickness of the coating layer to be in a range of 1 to 200 nm, and the coverage to be 30% by area of the entire area of the grain boundary, the thickness of the sintered coating layer as well as the area ratio of the coating layer in relation to the grain boundary area surrounding the electrode active material particles can be made in a desired range.

Moreover, the mass ratio of the coated coating layer in relation to the electrode active material is preferably 0.1% by mass or more, more preferably 5% by mass or more, and most preferably 7% by mass or more. In a case in which the mass ratio of the coating layer is less than 0.1% by mass, it becomes difficult to sufficiently obtain the reaction suppressing effect during calcination.

On the other hand, the upper limit of the mass ratio of the coating layer in relation to the mass of the electrode active material of the electrode layer is preferably 20% by mass or less, more preferably 15% by mass or less, and most preferably 10% by mass or less. In a case of exceeding 20% by mass, the ionic conduction resistance is increased.

Although the electrode layer precursor and the solid electrolyte layer precursor may be pressure-formed from the raw material powder as described above, formation of a green sheet is preferable because it is easy to form the green sheet in the shape of a thin sheet or an arbitrary shape.

Here, the green sheet can mean an un-calcined body that is made by mixing an organic binder, a plasticizing material, a solvent, etc. with a powder before calcination such as of glass, glass ceramics or ceramics to form a slurry, then shaping the slurry into a thin sheet, and subsequently volatilizing the solvent. This formation can be performed by way of a doctor blade method, a calendaring method, a coating method such as spin coating or dip coating, a printing method, a dye coater method, a spray method, etc. The green sheet before calcination is flexible, and thus can be cut into an arbitrary shape or can also be laminated.

A general-purpose binder that is commercially available as a formation auxiliary agent for press forming, rubber pressing, extrusion and injection forming can be used as the organic binder. More specifically, acrylic resin, ethyl cellulose, polyvinylbutyral, methacrylic resin, urethane resin, butyl meta acrylate, vinyl copolymer, etc. can be used. In order to easily maintain a sheet shape, the lower limit of the content of the organic binder in relation to the amount of the mixed slurry composed of the electrode active material powder, the solid electrolyte powder, the organic binder, the plasticizing material, the solvent, etc. is preferably 1% by mass or more, more preferably 3% by mass or more, and most preferably 5% by mass or more.

Moreover, in order to easily reduce voids after degreasing, the upper limit of the content of the organic binder in relation to the amount of the mixed slurry is preferably 50% by mass or less, more preferably 40% by mass or less, and most preferably 30% by mass or less.

The solvent may be used for homogeneously dispersing the powder. Although a well-known material such as PVA, IPA, butanol, toluene, xylene, acetonitrile or NMP can be used as the solvent, alcohol or water is preferable in terms of being capable of reducing the environmental load. In order to obtain an even more homogeneous and dense solid electrolyte, an appropriate amount of dispersing agent can also be added together with the electrode active material, the solid electrolyte powder and the organic binder; and in order to achieve good bubble elimination when mixing and desiccating, an appropriate amount of surfactant can also be added.

In addition, an inorganic compound including Li can also be contained in the green sheet at the same time. In this case, the inorganic compound including Li serves as a sintering agent (binder) having a function to combine particles when calcining. Examples of the inorganic compound including Li include $Li\ PO_4$, $LiPO_3$, $LiI$, $LiN$, $Li_2O$, $Li_2O_2$, $LiF$, etc.

The green sheet is formed into a sheet shape by using a well-known method such as the doctor blade method and the calendaring method. In order to avoid causing a crack on the surface of the green sheet by reducing an amount of internal residual solvent as much as possible in a step of desiccating the green sheet, the lower limit of the thickness of the formed green sheet is preferably 300 μm or less, more preferably 150 μm or less, and most preferably 100 μm or less. Moreover, in order to provide a stable handling property, the lower limit of the thickness of the green sheet is preferably 1 μm or more, more preferably 5 μm or more, and most preferably 10 μm or more. Furthermore, the green sheet may be processed into an arbitrary shape as necessary. The same type of green sheets may be laminated in order to achieve a desired thickness of the sintered solid electrolyte, the sintered electrode, etc. In addition, the green sheet may be pressurized by way of roll pressing, uniaxial pressing, isostatic pressing, etc. in order to improve the denseness of the sintered solid electrolyte.

In a case in which the green sheets of the positive electrode, the solid electrolyte and the negative electrode are laminated, the upper limit of the thickness of the laminated green sheets is preferably 2 mm or less, more preferably 1 mm or less, and most preferably 800 μm or less, in order to reduce calcination time. Furthermore, in order to reduce the degree of waviness of the electrode layer or the solid body electrode layer to be formed, the lower limit of the thickness of the green sheets is preferably 30 μm or more, more preferably 100 μm or more, and most preferably 200 μm or more. Moreover, these green sheets may be laminated on a support and calcined in order to prevent the laminate of the green sheets from bending or breaking when being calcined.

The maximum temperature when performing an electrode layer calcination step of calcining the electrode layer precursor is preferably 850 to 1,100 degrees Celsius, more preferably 900 to 1,050 degrees Celsius, and most preferably 950 to 1,000 degrees Celsius.

The maximum temperature when performing a solid electrolyte layer calcination step of calcining the solid electrolyte layer precursor is preferably 850 to 1,100 degrees Celsius, more preferably 900 to 1,050 degrees Celsius, and most preferably 950 to 1,000 degrees Celsius.

In the electrode layer calcination step of calcining the electrode layer precursor, or in the step of calcining the laminate of the electrode layer precursor and the solid electrolyte layer precursor including at least one electrode layer precursor, the calcination is preferably performed in an atmosphere including at least one gas selected from the group consisting of $N_2$, $H_2$, He, Ar, $CO_2$, CO and $CH_4$. Since such an atmosphere suppresses deterioration and burning up of the coating layer, the effect of the coating layer to suppress a decomposition reaction of the solid electrolyte and the electrode active material can be easy to obtain.

In addition to the above, the deterioration and burning up of the coating layer is also suppressed by a step of calcining a compact composed of a material being capable of reducing oxygen partial pressure in a sintering atmosphere while the compact is in contact with the electrode layer precursor; therefore, the effect of the coating layer to suppress a decomposition reaction of the electrode active material and the solid electrolyte can be easy to obtain. This may be performed together with the calcination in the atmosphere including the gas.

The material being capable of reducing oxygen partial pressure is preferably a material being capable of developing a combustion reaction with oxygen in the atmosphere. More specifically, the material is preferably a carbon-based material or a sheet with metallic particles dispersed in a carbon-based material, and most preferably a setter composed of graphite or a setter composed of graphite with fine particles of Fe dispersed therein.

From the viewpoint of the balance between the ionic migration resistance in the electrode layer and the battery capacity, the thickness of the sintered electrode layer is preferably 5 μm to 1 mm, more preferably 10 to 500 μm, and most preferably 20 to 100 μm. In a case in which a function as a support is imparted to one electrode (for example, the negative electrode), the upper limit of the thickness of the electrode may be 2 mm. The thickness of the sintered solid electrolyte layer would be sufficient as long as the negative electrode and the positive electrode can be isolated, and is preferably thin, but in terms of a good balance with the mechanical strength, the thickness is preferably 1 to 100 μm, more preferably 1 to 50 μm, and most preferably 1 to 20 μm.

EXAMPLES

The present invention is hereinafter described by providing specific examples.

Example 1

Preparation of Electrolyte

As raw materials, $H_3PO_4$, $Al(PO_3)_3$, $Li_2CO_3$, $SiO_2$ and $TiO_2$ were used. These raw materials were weighed to obtain a composition in mol % on an oxide base having 35.0% $P_2O_5$, 7.5% $Al_2O_3$, 15.0% $Li_2O$, 38.0% $TiO_2$ and 4.5% $SiO_2$. The raw materials were mixed uniformly and then put into a platinum pot. The raw materials were heated and melted while being stirred in an electric furnace at 1500 degrees Celsius for 4 hours to provide molten glass. Subsequently, the molten glass was dripped into flowing water to obtain flaky glass.

The flaky glass was crushed by using a laboratory scale jet mill. Subsequently, classification was performed by using a rotary roller made of zirconia to form a powder with an average particle diameter of 20 μm. This powder was further crushed by using a planetary ball mill, an attritor, a bead mill, etc. to obtain a raw glass powder of lithium ion conducting glass ceramics (hereinafter referred to as the raw glass powder) with an average particle diameter of 0.6 μm.

On the other hand, crystallization was performed by heat-treating the flaky glass at 950 degrees Celsius for 12 hours to obtain glass ceramics of interest. By way of powder X-ray diffractometry of the deposited crystalline phase, it was confirmed that $Li_{1+x+y}Al_xTi_{2-x}Si_yP_{3-y}O_{12}$ (0≤x≤0.4 and 0<y≤0.6) was the main crystalline phase. Moreover, lithium ion conductivity of the glass ceramics was about $1 \times 10^{-3}$ S/cm. Glass ceramics flakes thus obtained were crushed by using a laboratory scale jet mill. Subsequently, classification was performed by using a rotary roller made of zirconia to obtain a powder of glass ceramics with an average particle diameter of 20 μm.

The powder thus obtained was further crushed by using a planetary ball mill, an attritor, a bead mill, etc. to obtain a lithium ion conducting glass ceramics powder (hereinafter referred to as LICGC) with an average particle diameter 0.6 μm.

Preparation of Solid Electrolyte Precursor 20 g of binder (N-3046, manufactured by Yuken Industry Co., Ltd.), 0.3 g of dispersant (N-1005, manufactured by Yuken Industry Co., Ltd.) and 25 g of water were blended into 100 g of LICGC, all of which were mixed by using alumina balls of φ10 mm. Furthermore, the mixture was defoamed by adding 0.5 g of antifoamer (N-3301, manufactured by Yuken Industry Co., Ltd.) in a hybrid mixing machine. Subsequently, a film was formed on a mold releasing film at a gap of 200 µm by using a coating machine to obtain a solid electrolyte precursor shaped like a green sheet with a thickness of 66 µm.

Preparation of Positive Electrode Layer Precursor

Three types of treatments were performed on $LiNiPO_4$ that is a positive electrode material manufactured by Kojundo Chemical Laboratory Co., Ltd. $LiNiPO_4$ (1): $LiNiPO_4$ was crushed to an average particle diameter of 3 µm by way of a planetary ball mill. $LiNiPO_4$ (2): $LiNiPO_4$ was crushed to an average particle diameter of 3 µm by way of a planetary ball mill. 2.5 g of 20% sucrose aqueous solution was added to 5 g of $LiNiPO_4$, and the mixture was desiccated while mixing thereof. The desiccated powder was put into a graphite crucible, a graphite powder was disposed on an upper portion of the crucible so as not to touch the sample, and a heat treatment was performed in an $N_2$ atmosphere at 700 degrees Celsius for 3 hours to obtain $LiNiPO_4$ on which carbon has been coated.

The powder thus obtained was crushed to an average particle diameter of 3 µm by way of a planetary ball mill. $LiNiPO_4$ (3): $LiNiPO_4$ was crushed to an average particle diameter of 1.0 µm by way of a planetary ball mill. 2.5 g of 20% sucrose aqueous solution was added to 5 g of $LiNiPO_4$, and the mixture was desiccated while mixing thereof. The desiccated powder was put into a graphite crucible, a graphite powder was disposed on an upper portion of the crucible so as not to touch the sample, and a heat treatment was performed in an $N_2$ atmosphere at 650 degrees Celsius for 1 hour to obtain $LiNiPO_4$ on which carbon has been coated.

4.5 g of LICGC, 5 g of graphite (manufactured by SEC Carbon, Ltd.; an average particle diameter of 3 µm), 6.0 g of binder (N-3046, manufactured by Yuken Industry Co., Ltd.), 0.8 g of dispersing agent (Cerander F, manufactured by Yuken Industry Co., Ltd.), 12 g of 1% carboxymethyl-cellulose (1105, manufactured by Daicel Chemical Industries, Ltd.) aqueous solution, 1.3 g of styrene-butadiene rubber solution (XR-9026, manufactured by Nippon A&L Inc. Inc.) and 2.67 g of pure water were blended into 10.5 g of $LiNiPO_4$ thus obtained, which were mixed by using alumina balls of φ10 mm and a pot mill to obtain slurry. Subsequently, the slurry thus obtained was formed into a sheet by way of a coating machine with a gap of 200 µm between a doctor blade and a cast sheet of the coating machine to obtain a positive electrode precursor P1 shaped like a green sheet.

0.85 g of LICGC, 0.15 g of acetylene black (Denka Black, manufactured by Denki Kagaku Kogyo Kabushiki Kaisha; average particle diameter of 35 nm) for P2, P4 and P5, and 0.21 g of the same acetylene black for P3 as a positive electrode electron conduction additive, 0.9 g of binder (N-3046, manufactured by Yuken Industry Co., Ltd.), 0.12 g of dispersing agent (Cerander F, manufactured by Yuken Industry Co., Ltd.), 1.8 g of carboxymethyl-cellulose (1105, manufactured by Daicel Chemical Industries, Ltd.) 1% aqueous solution, 0.2 g of styrene-butadiene rubber solution (XR-9026, manufactured by Nippon A&L Inc.) and 1.4 g of pure water were blended into each 2.0 g of $LiNiPO_4$(1) to (3), which were mixed by using alumina balls of φ10 mm and a pot mill to obtain a slurry. Subsequently, the slurry thus obtained was formed into a sheet by way of a coating machine with a gap of 200 µm between a doctor blade and a cast sheet of the coating machine to obtain positive electrode precursors P2 to P5 shaped like a green sheet with a thickness of 70 µm.

TABLE 1

| | Positive Electrode Layer Precursor | | | | |
|---|---|---|---|---|---|
| | P1 | P2 | P3 | P4 | P5 |
| Positive Electrode Material | $LiNiPO_4$ (1) | $LiNiPO_4$ (1) | $LiNiPO_4$ (1) | $LiNiPO_4$ (2) | $LiNiPO_4$ (3) |
| Thickness Of Coating Layer (nm) | 0 | 0 | 0 | 50 | 5 |
| Coverage Of Coating Layer (%) | 0 | 0 | 0 | 65 | 100 |
| Crushing Treatment After Carbon Coating | — | — | — | Treated | Not Treated |
| Positive Electrode Electron Conduction Additive | Graphite | Acetylene Black | Acetylene Black | Acetylene Black | Acetylene Black |
| Positive Electrode Active Material Vs Solid Electrolyte (Mass Ratio) | 7:3 | 7:3 | 7:3 | 7:3 | 7:3 |

Preparation of Negative Electrode Layer Precursor

A graphite powder (SGP3, manufactured by SEC Carbon, Ltd.) with an average particle diameter of 3 µm, LICGC and ethyleneglycol were blended at a mass ratio of 3:7:10, and were mixed by using alumina balls of φ10 mm and a pot mill to obtain a slurry. The slurry thus obtained was formed into a sheet with a gap of 200 µm by using a coating machine, subsequently desiccated, and separated from a mold releasing film to obtain a mixed powder. 1.5 g of the mixed powder thus obtained was formed into a tablet of φ30 mm with a load of 2 t to obtain a negative electrode precursor with a thickness of 1.5 mm.

Lamination and Sinter of Solid Electrolyte Precursor, Positive Electrode Layer Precursor and Negative Electrode Precursor A negative electrode precursor, a solid electrolyte precursor, and a positive electrode layer precursor were laminated in this order. The laminate was shaped like a disc of φ30 mm, and the thickness thereof was 1.5 mm. This laminate was interposed between SUS boards, wrapped in a rubber sheet, vacuum-packed, and pressurized at a load of 2 t by way of cold isostatic pressing. The laminate was interposed between graphite slabs such that carbon in the laminate does not react with oxygen in the atmosphere, and was then calcined in a 100% $N_2$ atmosphere at 1,000 degrees Celsius for 20 minutes to sinter the laminate and prepare Samples 1 to 5.

Results

Evaluation tests of electric resistance between terminals and of charge and discharge characteristics were performed for Samples 1 to 5 thus prepared. A list of the results is shown in Table 2.

In Sample 1, graphite with an average particle diameter of 3 µm was used as a positive electrode electron conduction additive. Electric resistance between terminals was as low as 1 Ω/$cm^2$, the positive electrode and the negative electrode were short-circuited, and a charging reaction was not shown. This was caused by the solid electrolyte having electrical conductivity due to deterioration of the solid electrolyte during calcination. When Sample 1 was analyzed with a powder X-ray diffractometer, a reduction phase of $Li_3PO_4$ and LICGC was detected, which are breakdown products of LICGC with low Li ionic conductivity. $LiNiPO_4$ being a positive electrode material directly contacted LICGC of an electrolyte membrane, a result of which LICGC deteriorated and ceased to function as an electrolyte. The configuration of Sample 1 did not function as a secondary battery.

In Sample 2, the electric resistance between terminals was 100 $\Omega/cm^2$ that was higher than that in Sample 1. When Sample 2 was analyzed with a powder X-ray diffractometer as in the case of Sample 1, the amount of the reduction phase of $Li_3PO_4$ and LICGC was lower than that in Sample 1. In Sample 2, a material serving as a coating layer was not coated on the positive electrode material particles, but acetylene black that was the positive electrode electron conduction additive had a small average particle diameter of 35 nm, and thus adhered to $LiNiPO_4$ by way of electrostatic attraction to form a coating layer, thereby limiting the contact of LICCG and $LiNiPO_4$, and that is considered to be the reason why the amount of the reduction phase of $Li_3PO_4$ and LICGC was lower than that in Sample 1. However, since the area on which the coating layer was present was 25% by area of the grain boundary surrounding the positive electrode material particles, the decomposition reaction of the electrode active material and the electrolytic grain boundary was not completely suppressed, and thus the electric resistance between terminals was still low. Therefore, Sample 2 did not show a charging reaction and did not function as a secondary battery.

In Sample 3, by increasing the amount of acetylene black as compared with that in Sample 2, confirmation of the effect thereof was performed. When the amount of acetylene black was increased from 0.15 g to 0.21 g, the area on which the coating layer was present increased to 35% by area. When the calcined sample was analyzed by way of a powder X-ray diffractometer, the amount of the breakdown product was halved, and the resistance between terminals also increased to 600 $\Omega/cm^2$. When an open circuit voltage was measured after charging 0.3 mAh/g at 5 V and 0.04 $mA/cm^2$ as a charge and discharge test, the open circuit voltage was 0.4 V, and the discharge capacity at this time was 0.04 mAh/g, showing a charge reaction and a discharge reaction. In other words, it was possible to confirm that Sample 3 functioned as a secondary battery by providing a coating layer to suppress the reaction of the electrode active material and the solid electrolyte during calcination.

In Sample 4, $LiNiPO_4$ was used as a material serving as a coating layer being coated on the positive electrode material particles. Therefore, when the calcined sample was analyzed by way of a powder X-ray diffractometer, a breakdown product was not detected, and the resistance between terminals also increased to 1 $k\Omega/cm^2$. When an open circuit voltage was measured after charging 9 mAh/g at 5 V and 0.5 $mA/cm^2$ as a charge and discharge test, the open circuit voltage was 3.0 V, and the discharge capacity at this time was 9 mAh/g, showing a higher capacity than that in Sample 3, and a function as a secondary battery was confirmed.

In Sample 5, the size of $LiNiPO_4$ particles was reduced, the treatment temperature when coating the coating layer on the positive electrode material particles was decreased, and a crushing treatment after mixing sucrose and calcining was not performed. Flaking of the carbon coat due to the crushing did not occur, the contact with LICGC was significantly suppressed, and the electric resistance between terminals also increased to 2 $k\Omega/cm^2$ that was the highest. When an open circuit voltage was measured after charging 90 mAh/g at 5 V and 0.5 $mA/cm^2$ as a charge and discharge test, the open circuit voltage was 4.0 V, and the discharge capacity at this time was 90 mAh/g that was the highest capacity, and a function as a secondary battery was confirmed.

TABLE 2

Relationship Between Positive Electrode Configuration And Charge And Discharge Characteristics In Fully Solid Battery

|  | Sample 1 | Sample 2 | Sample 3 | Sample 4 | Sample 5 |
|---|---|---|---|---|---|
| Positive Electrode Layer Precursor | P1 | P2 | P3 | P4 | P5 |
| Thickness Of Sintered Positive Electrode Layer (μm) | 40 | 40 | 40 | 40 | 40 |
| Thickness Of Sintered Solid Electrolyte Layer (μm) | 20 | 20 | 20 | 20 | 20 |
| Thickness Of Sintered Negative Electrode Layer (mm) | 1.5 | 1.5 | 1.5 | 1.5 | 1.5 |
| Thickness Of Sintered Coating Layer (nm) (Positive Electrode) | 0 | 32* | 32* | 50 | 5 |
| % By Area On Which Coating Layer Is Present (Positive Electrode) | 0 | 25* | 35* | 70 | 100 |
| Positive Electrode Current Collector | Al | Al | Al | Al | Al |
| Negative Electrode Current Collector | Cu | Cu | Cu | Cu | Cu |
| Electronic Resistance Between Terminals ($\Omega/cm^2$) | 1 | 100 | 600 | 1000 | 2000 |
| Charge Capacity (mAh/g) | — | — | 0.3 | 9 | 90 |
| Discharge Capacity (mAh/g) | — | — | 0.04 | 9 | 90 |
| Charge Curent Density ($mA/cm^2$) | — | — | 0.04 | 0.5 | 0.5 |
| Discharge Curent Density ($mA/cm^2$) | — | — | 0.01 | 0.1 | 0.1 |
| Open Circuit Voltage After Charging (V) | — | — | 0.4 | 3.0 | 4.0 |

*Acetylene black contained as the electron conduction additive in the electrode layer served as a coating layer.

Example 2

In order to confirm the effect of the coating layer, confirmation of whether decomposition temperature was increased was performed by mixing and calcining the electrode active material powder, on which a material serving as a coating layer has been coated, and LICGC. Table 3 shows a list of results in a case of coating with carbon, and Table 4 shows a list of results in a case of coating with copper. The decomposition temperature tended to be increased by the presence of the coating layer, and the decomposition reaction of the electrode active material and the solid electrolyte tended to be suppressed by the presence of the coating layer.

More specifically, the electrode material and LICGC were blended at a mass ratio of 7:3, and were mixed by using a ball mill; and subsequently, a calcination treatment was performed in a pure $N_2$ atmosphere at 800 degrees Celsius, and a TG-DTA analysis was performed. In the treatment to coat the electrode active material powder with carbon, 2.5 g of a 20% by mass sucrose aqueous solution was added to 5 g of the electrode active material powder, and the mixture was desiccated while mixing thereof. The desiccated powder was put into a graphite crucible, a graphite powder was disposed on an upper portion of the crucible so as not to touch the sample, and a heat treatment was performed in an $N_2$ atmosphere at 650 degrees Celsius for 1 hour to obtain an electrode active material powder on which carbon has been coated. A thickness of all the carbon coating on the electrode active material thus prepared was about 20 nm.

In the treatment to coat the electrode active material powder with copper, 3.0 g of 25% by mass of copper acetate aqueous solution was added to 5 g of the electrode active material powder, and the mixture was desiccated while mixing thereof. The desiccated powder was put into a graphite crucible, a graphite powder was disposed on an upper portion of the crucible so as not to touch a catalyst, and a heat treatment was performed in an $N_2$ atmosphere at 650 degrees Celsius for 1 hour to obtain an electrode active material powder on which copper has been coated. A thickness of all the copper coating on the electrode active material powder thus prepared was about 15 nm.

TABLE 3

| | Crystal Structure Confirmation With XRD (800° C.) *1 | | Decomposition Temperature *2 | | |
|---|---|---|---|---|---|
| | Without Carbon Coating | With Carbon Coating | Without Carbon Coating | With Carbon Coating | Change Of Decomposition Temperature |
| $LiCoO_2$ | x | Δ | 813° C. | 850° C. | +37° C. |
| $LiNiO_2$ | x | x | 598° C. | 652° C. | +54° C. |
| $LiMn_2O_4$ | x | o | 554° C. | 648° C. | +94° C. |
| $LiNi_{0.34}Co_{0.33}Mn_{0.33}O_2$ | o | o | 643° C. | 792° C. | +149° C. |
| $LiFePO_4$ | o | o | 868° C. | 922° C. | +54° C. |
| $LiNiPO_4$ | o | o | 916° C. | 942° C. | +26° C. |
| $LiMnPO_4$ | o | o | 849° C. | 912° C. | +63° C. |
| $Li_4Ti_5O_{12}$ | o | x | 589° C. | 705° C. | +116° C. |

*1. Symbol o denotes that the crystal structure was maintained; symbol Δ denotes that LICGC was decomposed; and symbol x denotes that the electrode material and LICGC were decomposed.
*2. The decomposition temperatures were the starting temperatures of an exothermic reaction that would not occur with a simple substance of the electrode material or LICCG by using TG-DTA.

TABLE 4

| | Crystal Structure Confirmation With XRD (800° C.) *1 | | Decomposition Temperature *2 | | |
|---|---|---|---|---|---|
| | Without Copper Coating | With Copper Coating | Without Copper Coating | With Copper Coating | Change Of Decomposition Temperature |
| $LiCoO_2$ | x | Δ | 813° C. | 891° C. | +78° C. |
| $LiNiO_2$ | x | o | 598° C. | 750° C. | +152° C. |
| $LiMn_2O_4$ | x | o | 554° C. | 688° C. | +134° C. |
| $LiNi_{0.34}Co_{0.33}Mn_{0.33}O_2$ | o | o | 643° C. | 822° C. | +179° C. |
| $LiFePO_4$ | o | o | 868° C. | 942° C. | +74° C. |
| $LiNiPO_4$ | o | o | 916° C. | 1005° C. | +89° C. |
| $LiMnPO_4$ | o | o | 849° C. | 952° C. | +103° C. |
| $Li_4Ti_5O_{12}$ | o | o | 589° C. | 855° C. | +166° C. |

*1. Symbol o denotes that the crystal structure was maintained; symbol Δ denotes that LICGC was decomposed; and symbol x denotes that the electrode material and LICGC were decomposed.
*2. The decomposition temperatures were the starting temperatures of an exothermic reaction that would not occur with a simple substance of the electrode material or LICCG by using TG-DTA.

Example 3

Preparation of Lithium Ion Conducting Glass Ceramics Sintered Carrier

Acrylic resin and a dispersing agent dispersed in water were added to a raw glass powder, and the mixture was stirred in a ball mill for 12 hours to prepare a slurry. In this slurry, the content of glass fine particles was 65.5% by mass, and the content of acrylic resin was 13.5% by mass. This slurry was formed into a sheet with a thickness of 20 μm on a PET film on which a mold release treatment has been performed by way of a doctor blade method, and primary desiccation at 80 degrees Celsius was performed and secondary desiccation at 95 degrees Celsius was further performed to obtain a sheet-like article. 26 pieces of sheet-like articles after exfoliating the PET film were laminated, and were pressurized at 196.1 MPa for 10 minutes by using an isostatic pressing device (CIP) to prepare a dense green sheet.

The green sheet was cut out into ϕ59.5 mm, and was calcined at 1,000 degrees Celsius for one hour to form a sintered carrier by placing a setter on the green sheet. When a resultant of the calcination treatment was examined by way of an X-ray diffraction method, the main crystalline phase was confirmed to be $Li_{1+x+y}Al_xTi_{2-x}Si_yP_{3-y}O_{12}$ (where $0 \leq x \leq 0.4$ and $0 < y \leq 0.6$). Moreover, the ionic conductance obtained by performing an impedance measurement was $2.0*10^{-4}$ Scm$^{-1}$. A thickness thereof was 380 μm, and a diameter thereof was ϕ50 mm.

Coating on Positive Electrode Material

Each of the positive electrode material powders of LiNiPO$_4$ and LiCoPO$_4$ were coated with carbon, copper, nickel, iron, and a nickel-magnesium alloy, respectively.

In the treatment to coat the electrode active material powder with carbon, 2.5 g of a 20% by mass sucrose aqueous solution was added to 5 g of the electrode active material powder, and the mixture was desiccated while mixing thereof. The desiccated powder was put into a graphite crucible, a graphite powder was disposed on an upper portion of the crucible so as not to touch the sample, and a heat treatment was performed in an N$_2$ atmosphere at 650 degrees Celsius for 1 hour to obtain an electrode active material powder on which carbon has been coated.

In the treatment to coat the electrode active material powder with copper, 3.0 g of a 25% by mass copper acetate aqueous solution was added to 5 g of the electrode active material powder, and the mixture was desiccated while mixing thereof. The desiccated powder was put into a graphite crucible, a graphite powder was disposed on an upper portion of the crucible so as not to touch the sample, and a heat treatment was performed in an N$_2$ atmosphere at 650 degrees Celsius for 1 hour to obtain an electrode active material powder on which copper has been coated.

In the treatment to coat the electrode active material powder with nickel, 10 g of a 10% by mass nickel acetate tetrahydrate aqueous solution was added to 5 g of the electrode active material powder, and the mixture was desiccated while mixing thereof. A graphite powder was disposed on an upper portion of the crucible so as not to touch a sample, and a heat treatment was performed in an N$_2$ atmosphere at 650 degrees Celsius for 1 hour to obtain an electrode active material powder on which nickel has been coated.

In the treatment to coat the electrode active material powder with iron, 16 g of a 10% by mass iron oxalate aqueous solution was added to 5 g of the electrode active material powder, and the mixture was desiccated while mixing thereof. A graphite powder was disposed on an upper portion of the crucible so as not to touch the sample, and a heat treatment was performed in an N$_2$ atmosphere at 650 degrees Celsius for 1 hour to obtain an electrode active material powder on which iron has been coated.

In the treatment to coat the electrode active material powder with a nickel-magnesium alloy, 9.5 g of a 10% by mass nickel acetate aqueous solution and 2.2 g of a 10% by mass magnesium acetate aqueous solution were added to 5 g of the electrode active material powder, and the mixture was desiccated while mixing thereof. A graphite powder was disposed on an upper portion of the crucible so as not to touch the sample, and a heat treatment was performed in an N$_2$ atmosphere at 650 degrees Celsius for 1 hour to obtain an electrode active material powder on which the nickel-magnesium alloy ($Ni_{0.9}Mg_{0.1}$) has been coated.

A thickness of all the coating on the electrode active material powder thus prepared was about 15 nm.

Test of Mixing/Decomposition Reaction with LICGC

An electrode material powder and an LICGC powder thus prepared were blended at a ratio of 7:3, and were mixed by way of a dry pot mill for 12 hours. A resultant of calcining the mixed sample in a nitrogen atmosphere at 900 degrees Celsius for 10 minutes was measured by way of an XRD to confirm a crystal structure thereof. Moreover, the mixed sample was measured by way of a TG-DTA to measure a kick-off temperature thereof. The condition of TG-DTA was 20 degrees Celsius/minute, and the measurement was performed in a range of room temperature to 1,000 degrees Celsius. Table 5 shows evaluation results. In Table 5, symbol o means that the crystal structure of the positive electrode material was maintained.

TABLE 5

| Positive Electrode Material | Coating Layer | Confirmation Of Crystal Structure With XRD | Decomposition Temperature |
|---|---|---|---|
| LiNiPO$_4$ | Without Coating Layer | o | 916° C. |
|  | C | o | 942° C. |
|  | Cu | o | 1000° C. |
|  | Ni | o | 952° C. |
|  | Fe | o | 920° C. |
|  | $Ni_{0.9}Mg_{0.1}$ | o | 955° C. |
| LiCoPO$_4$ | Without Coating Layer | o | 903° C. |
|  | C | o | 928° C. |
|  | Cu | o | 982° C. |
|  | Ni | o | 925° C. |
|  | Fe | o | 912° C. |
|  | $Ni_{0.9}Mg_{0.1}$ | o | 932° C. |

Baking of Positive Electrode onto Lithium Ion Conducting Glass Ceramics Sintered Carrier Electrode active materials having a coating layer, and electrode active materials on which a coating treatment has not been performed were respectively prepared as shown in Table 6 to prepare a positive electrode slurry. The positive electrode slurry thus prepared was applied to one side of the lithium ion conducting glass ceramics sintered carrier. Subsequently, this was disposed in a sintering furnace, a carbon powder was disposed on an upper portion of the sintering furnace, and calcination was performed in a nitrogen atmosphere at 900 degrees Celsius for 10 minutes.

TABLE 6

| Positive Electrode Material | Coating Layer | Positive Electrode Material (g) | Electron Conduction Additive (g) | Raw Glass Powder (g) | Binder (g) | Dispersing Agent (g) | Solvent (g) |
|---|---|---|---|---|---|---|---|
| LiNiPO$_4$ | Without Coating Layer | 3.5 | 0.25 | 1.5 | 3.0 | 0.02 | 3.9 |
| LiNiPO$_4$ | C | 3.5 | 0.25 | 1.5 | 3.0 | 0.02 | 3.9 |
| LiNiPO$_4$ | Fe | 3.5 | 0.25 | 1.5 | 3.0 | 0.02 | 3.9 |
| LiNiPO$_4$ | Ni | 3.5 | 0.25 | 1.5 | 3.0 | 0.02 | 3.9 |
| LiNiPO$_4$ | Ni$_{0.9}$Mg$_{0.1}$ | 3.5 | 0.25 | 1.5 | 3.0 | 0.02 | 3.9 |
| LiCoPO$_4$ | Without Coating Layer | 3.5 | 0.25 | 1.5 | 3.0 | 0.02 | 3.9 |
| LiCoPO$_4$ | C | 3.5 | 0.25 | 1.5 | 3.0 | 0.02 | 3.9 |
| LiCoPO$_4$ | Fe | 3.5 | 0.25 | 1.5 | 3.0 | 0.02 | 3.9 |
| LiCoPO$_4$ | Ni | 3.5 | 0.25 | 1.5 | 3.0 | 0.02 | 3.9 |
| LiCoPO$_4$ | Ni$_{0.9}$Mg$_{0.1}$ | 3.5 | 0.25 | 1.5 | 3.0 | 0.02 | 3.9 |

Baking of Negative Electrode onto Lithium Ion Conducting Glass Ceramics Sintered Carrier As shown in Table 7, as a negative electrode material, a powder of Li$_4$Ti$_5$O$_{12}$ manufactured by Ishihara Sangyo Kaisha, Ltd. was mixed with a binder, a dispersing agent and a solvent to prepare negative electrode slurry. In the LICGC sintered carrier to which each positive electrode slurry has been applied, the negative electrode slurry was applied to a surface opposite to the side to which the positive electrode slurry has been applied, slurry in the periphery was wiped off by using wiping rags and the sintered carrier was left at rest in the atmosphere to desiccate the slurry. This was disposed in a sintering furnace, a carbon powder was disposed on an upper portion of the sintering furnace, and calcination was performed in a nitrogen atmosphere at 500 degrees Celsius for 10 minutes.

TABLE 7

| Negative Electrode Material | Negative Electrode Material (g) | Binder (g) | Dispersing Agent (g) | Solvent (g) |
|---|---|---|---|---|
| Li$_4$Ti$_5$O$_{12}$ | 4.75 | 2.0 | 0.1 | 4.5 |

Attachment of Current Collector

A cell current collector, onto which the positive electrode and the negative electrode have been baked, was attached to the lithium ion conducting glass ceramics sintered carrier. More specifically, aluminum foil of φ45 mm was laid on the positive electrode side of the cell, copper foil of φ45 mm was laid on the negative electrode side thereof, respectively, leads of 5 mm in width made of the same material were laid thereon, and the cell was vacuum-packed.

Charge and Discharge Test

A charge and discharge test was performed, in which a CC-CV charge current was 300 μA, a retention period was 3 hours after the CV charge, and a charging voltage was 6V. The discharge was performed with CC discharge at 50 μA and 0.01 V cut-off. Table 8 shows open circuit voltages after 2-minute retention after discharge, and discharge capacities at the cut-off time.

TABLE 8

| Positive Electrode | Coating Layer | Negative Electrode | Open Circuit Voltage (mV) | Discharge Capacity (mAh/g) |
|---|---|---|---|---|
| LiNiPO$_4$ | Without Coating Layer | Li$_4$Ti$_5$O$_{12}$ | 1540 | 7 |
| | C | | 3950 | 90 |
| | Cu | | 3750 | 72 |
| | Ni | | 4075 | 95 |
| | Fe | | 4025 | 93 |
| | Ni$_{0.9}$Mg$_{0.1}$ | | 4120 | 105 |
| LiCoPO$_4$ | Without Coating Layer | Li$_4$Ti$_5$O$_{12}$ | 1630 | 9 |
| | C | | 3450 | 80 |
| | Cu | | 3225 | 63 |
| | Ni | | 3470 | 84 |
| | Fe | | 3500 | 81 |
| | Ni$_{0.9}$Mg$_{0.1}$ | | 3610 | 84 |

From the results shown in Tables 5 and 8, in a case in which LiNiPO$_4$ and LiCoPO$_4$ were used as a positive electrode material, the reactivity with the LICGC powder when calcining was low, and thus by-products were not readily generated; however, in a case in which the coating layer was not provided, the discharge capacity decreased. On the other hand, in a case in which the coating layer was provided, the discharge capacity increased. This is considered to be a result of increasing substantial reactive interfaces by improvement of the electrical conductivity of the positive electrode interface due to the presence of the coating layer.

Except for the copper coating, the coating layers made of metal and alloy exhibited discharge capacities higher than those of the carbon coating.

Since all the alloy was sintered with a positive electrode material, the bonding thereof was strong. On the other hand, since carbon cannot be sintered at a low temperature, the carbon coating assumed a state in which the carbon coating adhered to the positive electrode material. Therefore, the carbon coating was also influenced by oxygen that remained when treating or sintering the slurry.

In a case in which the coating layer was metal or alloy, the discharge capacity increased in the order of copper, iron, nickel, and nickel-magnesium alloy. This resulted from the thermal expansion coefficient being different from that of the coated material. Since the difference of expansion coefficients is large in copper, it is considered that micro-cracks occurred at the time of heat treatment, and interfaces were comparatively reduced.

What is claimed is:

1. An all-solid battery that does not employ organic compound, comprising: two electrode layers composed of a positive electrode layer and a negative electrode layer interposing a solid electrolyte layer therebetween,
   wherein at least one of the two electrode layers is composed of a sintered body of a mixed material including at least one or more types of electrode active material particles comprising electrode active material and solid electrolyte particles comprising solid electrolyte, and
   wherein a grain boundary of the electrode active material particles and the solid electrolyte particles including a portion of at least 30% by area of a grain boundary area surrounding the electrode active material particles has a coating layer with a thickness of 1 to 200 nm, and wherein
   the coating layer is composed of a simple substance of C, or a metal consisting of any of the elements of Ni, Co, Fe, Mn, Cr, and Cu, or an alloy consisting of two or more of these elements.

2. The all-solid battery according to claim 1, wherein content of the coating layer is 0.1% by mass or more in relation to an electrode active material, in at least one of the electrode layers.

3. The all-solid battery according to claim 1, wherein content of a solid electrolyte particles is 10 to 70% by mass in relation to an electrode active material, in at least one of the electrode layers.

4. The all-solid battery according to claim 1, wherein the solid electrolyte contained in the solid electrolyte particles is a chemical compound including a form of crystal having lithium ion conductivity.

5. The all-solid battery according to claim 4, wherein the crystals having lithium ion conductivity have molecular formula $Li_{1+x+z}M_x(Ge_{1-y}Ti_y)_{2-x}Si_zP_{3-z}O_{12}$, where $0 \leq x \leq 0.8$, $0 \leq y \leq 1.0$, $0 \leq z \leq 0.6$, and M is at least one selected from Al or Ga.

6. The all-solid battery according to claim 1, wherein the electrode active material is a material including at least one chemical element selected from the group consisting of C, Li, Mg, Mn, Fe, Co, Ni, B, Al, Ti, Si, Ge, Sn, Bi, W and O.

7. The all-solid battery according to claim 1, wherein the solid electrolyte layer and the electrode layer composed of the sintered body are joined by calcining.

8. The all-solid battery according to claim 1, wherein the grain boundary including a portion of at least 65% by area of the grain boundary area has a coating layer with a thickness of 1 to 200 nm.

9. An all-solid battery, comprising:
   a positive electrode layer, a negative electrode layer and a solid electrolyte layer;
   the solid electrolyte layer is interposed between the positive electrode layer and the negative electrode layer;
   at least one of the positive and negative electrode layers is composed of a sintered body of a mixed material, wherein said mixed material comprises at least one of electrode active material particles and solid electrolyte particles, and a grain boundary of said electrode active material particles and said solid electrolyte particles has a coating layer;
   said coating layer coats a portion of at least 30% by area of a grain boundary area surrounding said electrode active material particles and said coating layer has a thickness of 1 to 200 nm;
   and wherein said coating layer is composed of a simple substance of C, or a metal consisting of any of the elements of Ni, Co, Fe, Mn, Cr and Cu, or an alloy consisting of two or more of these elements;
   and wherein said all-solid battery does not employ organic compound.

* * * * *